Patented Sept. 6, 1932

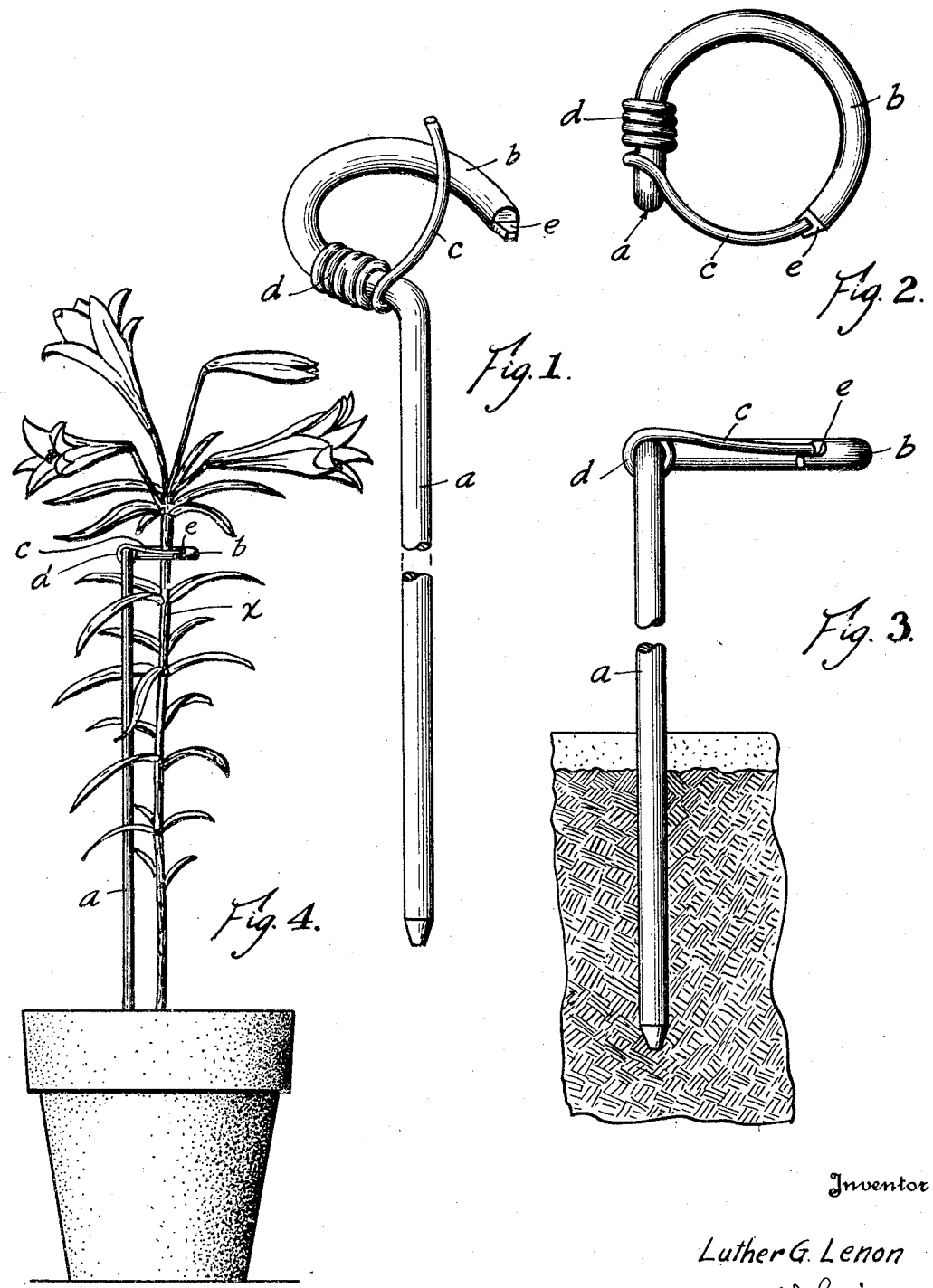

1,875,618

UNITED STATES PATENT OFFICE

LUTHER G. LENON, OF PORTLAND, OREGON

PLANT STALK SUPPORTER

Application filed May 2, 1931. Serial No. 534,540.

My invention relates to devices for supporting the stalks of garden or potted plants in an upright position.

Heretofore, various types of plant supporters or holders for supporting the stalk of a plant or flower have been used, but none within my experience have been provided with practical means for conveniently engaging the holder with the plant stalk in such a manner that it cannot become easily disengaged therefrom.

The object of my invention is, therefore, to provide a stalk holder adapted to be thrust into the ground at the base of the plant and provided with an open loop at its upper end so arranged as to encircle the stalk transversely, whereby the said loop may be conveniently engaged around the stalk without crushing or otherwise injuring it.

A further object of my invention is to provide simple and inexpensive means comprising a closure for said open loop adapted, when open, to be conveniently positioned to permit the stalk to be engaged by the loop and when closed to prevent the stalk from becoming disengaged from said loop under the effect of the wind or other causes which may cause the stalk to sway.

A further object of my invention is to provide means carried by the free end of the loop adapted to form a seat for said closure means, whereby the latter will be supported and prevented from slipping off the end of the loop and inadvertently opening, which would allow the stalk to become disengaged from the loop.

I have found it preferable to construct my stalk holder of relatively stiff "hard" wire, not only because it is most conveniently manufactured from such material, but also because the said wire permits the stalk and its holder to bend with the wind and thus yield with less danger of being broken by a very strong wind or the like.

My stalk holder is particularly useful for garden flowers or plants in that, being made of wire of relatively small diameter and colored preferably green, it is quite unnoticeable and does not detract from the appearance of the plant or flower, in the manner of the well known green stakes with white tops, customarily used.

Further, my stalk holder is useful for potted plants, which when transported from place to place, by a florist for example, are subjected to considerable swaying of the delivery car and are thus supported and prevented from being broken or otherwise damaged.

I attain my objects in a stalk holder comprising a stake member, the stake provided at its upper end with an open loop adapted to be engaged with the stalk of a plant, an arm, one end of which is coiled about the portion of the loop adjacent the stake and the other end projecting outwardly so as to rest upon the free end of the loop to form a closure therefore, the free end of said loop provided with a seat for the end of said arm.

These and other incidental features of my invention, the details of construction and the mode in which my stalk holder is used are hereinafter fully described with reference to the accompanying drawing.

In the drawing:

Fig. 1 shows a perspective view of my stalk holder and illustrates the same with the closure means for the loop in open position;

Fig. 2 shows a view looking down on my stalk holder as shown in Fig. 1, and illustrates further details of construction of the loop;

Fig. 3 shows a fragmentary elevation of my stalk holder with the closure means for the loop in closed position; and Fig. 4 shows my stalk holder engaged with the stalk of a plant.

Referring now to the figures, my stalk holder comprises a stake-like body portion $a$ constructed preferably of wire, which is slightly flexible so as to yield with the wind or other force that might cause the plant to sway.

The upper end of the stake $a$ is bent to form an open loop $b$, lying in a transverse plane normal to the stake $a$ and is thus adapted when the stake is thrust into the ground at the base of the plant, as shown in Fig. 4, to be engaged with the stalk $x$ of the plant without crushing or otherwise injuring it.

In order to prevent the stalk from becoming disengaged from the loop $b$, I have provided simple and inexpensive closure means therefor, comprising an arm $c$, one end of which is coiled about the portion of the loop $b$ adjacent the stake, as at $d$, and which extends outwardly so as to rest when in the position shown in Fig. 3, on the free end of the loop $b$.

By this construction, which is not only convenient from a manufacturing point, I provide a slight resistance to the movement of the arm so that it will remain in whatever position it is set and will not readily be opened inadvertently and permit the stalk to become disengaged.

A step or seat $e$, see Figs. 1 and 3, is formed in the end of the loop $b$ for receiving the arm $c$ which thus prevents the said arm $c$ from slipping off the end of the loop, as would be the case, were the arm supported merely upon the cylindrical surface of the wire.

The mode in which my stalk holder is used, is illustrated in Fig. 4 for supporting the stalk of a potted plant, but it is obvious that my stalk holder will be equally useful for supporting the stalks of garden flowers and will be quite inconspicuous as I preferably paint it green and construct it from 8 and 9 gauge "hard" wire, the gauge depending on the length of the stalk holder desired.

I claim:

1. A stalk holder comprising a stake member, the upper end of said stake bent to form an open loop lying in a transverse plane normal to the stake and thereby adapted to engage the stalk of a plant, an arm, one end of which is coiled about the portion of the loop adjacent the stake and the other end projecting outwardly so as to rest upon the free end of the loop to form a closure therefor.

2. A stalk holder comprising a stake member, the upper end of said stake bent to form an open loop lying in a transverse plane, normal to the stake and thereby adapted to engage the stalk of a plant, an arm, one end of which is coiled about the portion of the loop adjacent the stake and the other end projecting outwardly so as to rest upon the free end of the loop to form a closure therefor, the free end of said loop provided with a seat for the end of said arm.

LUTHER G. LENON.